United States Patent [19]

Sterling, Jr. et al.

[11] Patent Number: 4,691,328

[45] Date of Patent: Sep. 1, 1987

[54] ON-LINE SERIAL COMMUNICATION INTERFACE FROM A COMPUTER TO A CURRENT LOOP

[75] Inventors: Edward L. Sterling, Jr., Cleveland; William L. Thompson, Montville, both of Ohio

[73] Assignee: The Babcock & Wilcox Company, New Orleans, La.

[21] Appl. No.: 764,915

[22] Filed: Aug. 12, 1985

[51] Int. Cl.[4] .......... H04L 5/00

[52] U.S. Cl. .......... 375/36; 340/310 R

[58] Field of Search .......... 340/310 R, 310 A; 375/36; 178/49, 63 R, 63 B, 66.1; 179/2 C; 307/2, 3; 332/31 T

[56] References Cited

U.S. PATENT DOCUMENTS

| | | | |
|---|---|---|---|
| 4,057,793 | 11/1977 | Johnson et al. | 340/310 R |
| 4,272,758 | 6/1981 | Giraud | 340/310 R |
| 4,504,959 | 3/1985 | Heckenbach | 375/36 |
| 4,520,488 | 5/1985 | Houvig et al. | 340/310 R |

*Primary Examiner*—Benedict V. Safourek
*Attorney, Agent, or Firm*—Vytas R. Matas; Robert J. Edwards

[57] ABSTRACT

An on-line serial communication interface is established from a digital circuit such as a computer or hand held terminal, to a current loop which has lines for connecting a transmitter to a power supply. The interface includes a diode which is connected in series with one of the lines of the current loop. The diode is connected in parallel to the source and drain of a FET. The control gate of the FET is connected to the output of a differential amplifier who receives as one of its inputs, a digital voltage pulse signal from the digital circuit. The other input of the amplifier is held at a selected voltage so that voltage pulses are output from the amplifier when the digital circuit generates its voltage pulses. This turns the FET on and off in synchronism with the voltage pulses, thus cutting the diode in and out of series with the line of the current loop. With the FET in its non-conducting off condition, the diode has a small voltage drop thereacross. This does not effect the current on the current loop. With the FET conducting and in its on state, the diode is cut out and its voltage drop is applied to the transmitter which is connected to the current loop. Communication can thus be established with the transmitter while again avoiding any interruption in the current on the current loop.

6 Claims, 2 Drawing Figures

ON-LINE SERIAL COMMUNICATION INTERFACE FROM A COMPUTER TO A CURRENT LOOP

FIELD AND BACKGROUND OF THE INVENTION

The present invention relates in general to digital interface equipment, and in particular to a new and useful on-line serial communication interface from a computer and/or terminal, to a current loop.

Two-wire analog transmission systems are well known. Such systems include a transmitter which is connected to a power supply by two wires which form a current loop. The transmitter includes, as at least one of its features, a transducer which senses a condition such as pressure or temperature. This condition is known as a process variable (PV).

A power supply is connected to the two wires to close the current loop. It is also conventional to provide a resistor in the current loop. The transmitter amplifies the signal from its transducer and this amplified signal is used to draw a certain current from the power supply which is proportional or otherwise related to the process variable. It is conventional to draw from a minimum of 4 mA to a maximum of 20 mA. The current between 4 and 20 mA passes through the resistor to produce a voltage drop across the resistor. This voltage drop can be measured to give a value for the process variable.

It is noted that the 4 mA minimum current is required to energize the circuitry of the transmitter. Any excess current above this 4 mA level is taken as a value which can be used to determine the process variable.

It is known that such 4–20 mA two-wire systems have an accuracy which is limited to around 0.1% at best. These systems are also essentially unidirectional with the transmitter being essentially uncontrolled and transmitting continuously.

The transmitters in such circuits are generally limited in accuracy to about 0.1% and their functionality is limited to only continuous reading and sensing of the process variable.

SUMMARY OF THE INVENTION

The present invention utilizes microprocessor technology to improve the overall accuracy and expand the functionality of transmitter devices.

The present invention provides an apparatus for interfacing a computer or hand held terminal with a current loop for digital communication to the two-wire transmitter while the transmitter is still on-line (sending analog information) to a controller or some monitoring device.

Accordingly an object of the present invention is to provide an on-line serial communication interface for a digital circuit such as a computer or hand held terminal, which digital circuit generates voltage pulses, to a current loop having lines for connecting a transmitter to a power supply for drawing current from the power supply according to a process variable sensed by the transmitter, comprising a diode connected in series in one of the lines of the current loop for establishing a voltage drop on the one line, an FET having a source and drain connected in parallel to the diode, the FET having a drain for receiving a voltage to render the FET conductive between its source and drain to short out the diode from the one line so as to apply the voltage drop to the transmitter connected to the one line, and a differential amplifier having an output connected to the FET gate and having two inputs, one of the inputs being connected to the digital circuit for receiving the pulses and the other input being connected to a selected constant voltage whereby the amplifier outputs voltage pulses which are applied to the FET gate for cutting the diode in and out of the one line, also in pulses.

A further object of the invention is to provide a serial communication interface between a current loop and a digital circuit which is simple in design, rugged in construction and economical to manufacture.

The various features of novelty which characterize the invention are pointed out with particularity in the claims annexed to and forming a part of this disclosure.

For a better understanding of the invention, it operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
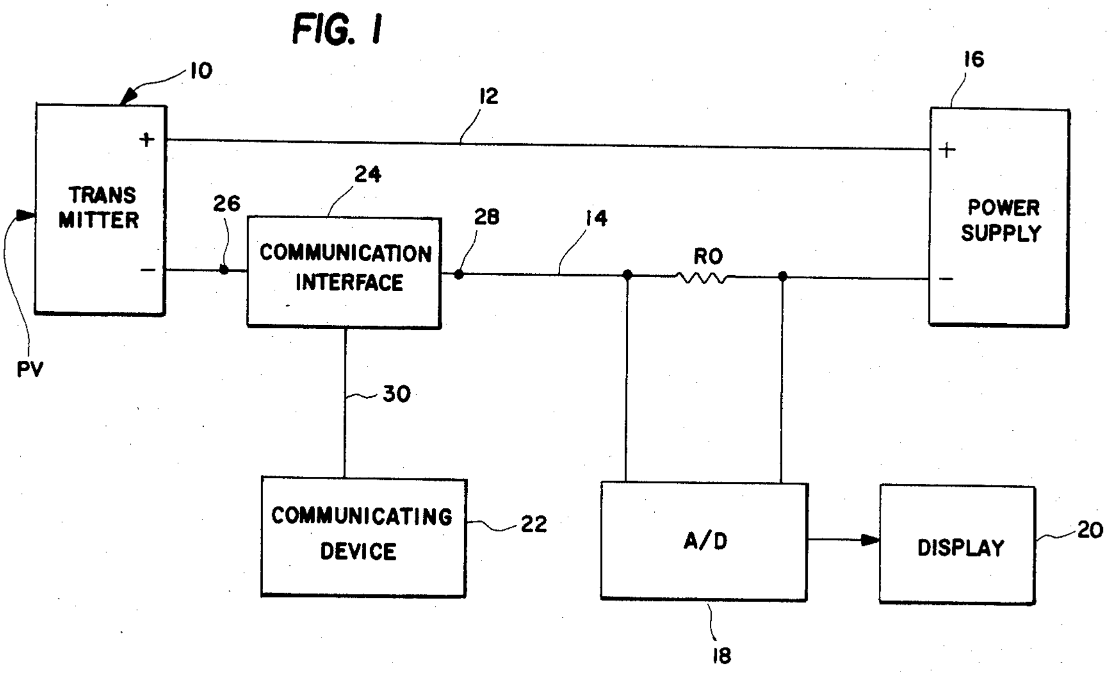
FIG. 1 is a block diagram showing a conventional current loop having a communication device such as a computer or hand held terminal connected to the current loop.

Referring to the drawings in particular, the present invention provides an on-line serial communication interface between a digital circuit shown as communication device 22 in FIG. 1 such as; an IBM PC, Radio Shack Model 100 Lap Computer, or Termiflex Hand Held Terminal, and a current loop formed by Bailey's Smart transmitter 10, lines 12,14, and any 12–48 VDC power supply 16. As is known, one of the lines 14 may include a resistor RO, which has a voltage drop thereacross proportional to a current flowing in the lines 12,14. Transmitter 10 may include a transducer such as a pressure or temperature transducer (not shown) which receives a process variable PV. The transducer may be connected to a microprocessor in transmitter 10 which controls the amount of current to be drawn from power supply 16 on lines 12 and 14.

The voltage drop across resistor RO is measured by an analog-to-digital convertor 18. This voltage drop can be displayed on a display unit 20 as a measurement of the process variable PV.

A communication interface unit 24 of the present invention is connected into the current loop line 14 at connection points 26 and 28. The interface unit receives digital inputs from a communicating device 22 through line 30. Communicating device 22 is a digital circuit such as a computer, microprocessor or hand held terminal. The device 22 sends digital information in the form of voltage pulses through line 30 to the communication interface 28 which in turn establishes digital communication with the current loop.

Figure 2:
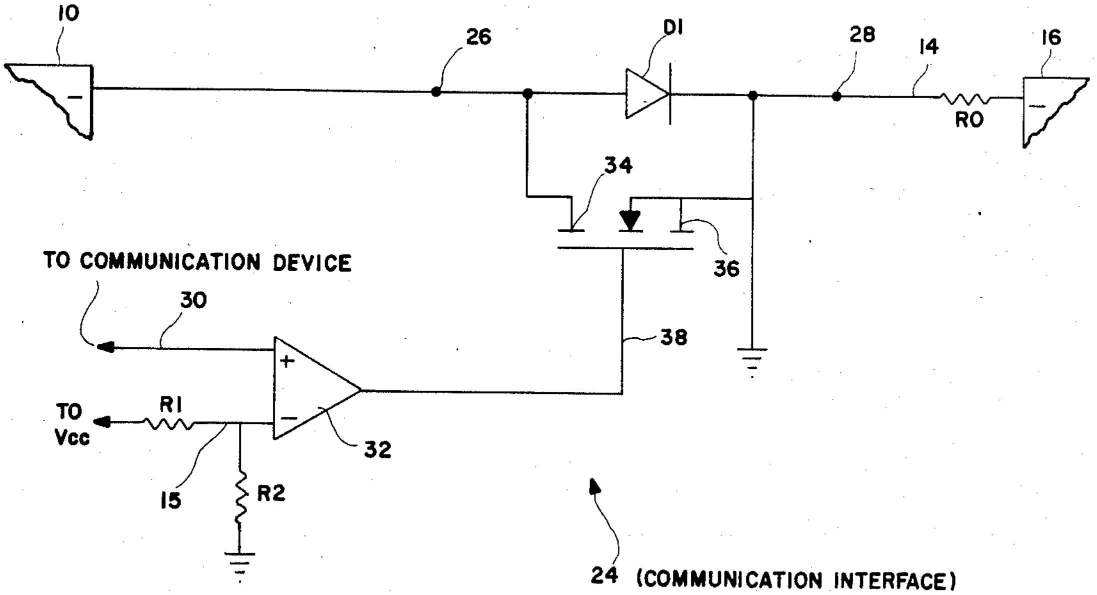
FIG. 2 is a schematic diagram of the inventive on-line serial communication interface between the communication device and the current loop.

FIG. 2 illustrates the on-line serial communication interface of the present invention.

According to the invention, a diode D1 is connected in series to one of the lines in the current loop of FIG.

1, in this case line 14 connected between the negative terminals of the transmitter and power supply.

An FET F1 has drain and source 34,36 connected in parallel across diode D1. The control gate 38 of FET F1 is connected to the output of, a differential amplifier 32. The positive input of amplifier 32 is connected to line 30 of communication device 22 for receiving the train of voltage pulses. The negative terminal of amplifer 32 is connected to a constant voltage $V_{cc}$ and on line 15 over a voltage divider R1, R2. The constant voltage at the negative terminal of amplifier 32 is compared with the voltage, on line 30. When a digital voltage pulse is applied to line 30 from the communicating device 22, the output of amplifier 32 also generates a voltage pulse which is applied to the gate 38 of FET F1. In this way diode D1 is short circuited in pulses from line 14. A pulsed digital signal thus appears on line 14 at transmitter 10. This signal is superimposed on any analog current signal which is being transmitted by transmitter 10. When the communicating device 22 is not transmitting any voltage pulse, the diode D1 remains in series with the line 14.

The signal from communicating device 22 is a serial RS-232C signal, which is sent one bit at a time. A logic high on this line is between 3 and 12 volts, a logic logic low is between −3 and −12 volts. This assumes that communicating device 22 is a computer or hand held terminal. Without any signal from communicating device 22, a ground potential is applied to the positive terminal of amplifier 32 over line 30. Line 15 is maintained above this potential by voltage $V_{cc}$. This is maintained at a small potential which is dependent on the resistor bridge R1, R2, and acts as the trip point for the signal applied to gate 38. Gate 38 is also at ground potential at this time so that FET F1 is off. A 0.7 volt drop appears across diode D1.

When communication begins the positive pulses on line 30 from communicating device 22 causes gate 38 to follow the turning on of FET F1 at every positive pulse. When the FET is turned on the voltage across diode D1 is shorted out and applied as an increase in voltage at the transmitter 10. The interface at the transmitter receives the pulse and conditions it for the microprocessor (not shown) in transmitter 10 to utilize.

A major advantage of the present invention is that communication can be achieved while the transmitter is still on-line with a controller. This is possible because there is no effect on the current in the loop. Communication is established by monitoring a voltage on the loop.

Another advantage of the invention is that the interface is powered by using the request to send line from the RS-232C port of the operator's communicating device 22. No extra power supply is necessary.

While a specific embodiment of the invention has been shown and described in detail to illustrate the application of the principles of the invention, it will be understood that the invention may be embodied otherwise without departing from such principles.

What is claimed is:

1. An on-line serial communication interface for a digital circuit for generating voltage pulses, to a current loop having lines for connecting a transmitter to a power supply to drain current from the power supply according to a process variable sensed by the transmitter, comprising:

- a diode connected in series in one of the lines of the current loop for establishing a voltage drop on the diode;
- an FET having a source and drain connected in parallel with the diode, said FET having a gate for receiving a voltage to render said FET conductive between its source and drain to short out said diode from applying its voltage drop to the one line; and
- a differential amplifier having an output connected to said FET gate, and two inputs, one of said inputs of said amplifier connected to the digital circuit for receiving the generated voltage pulses and the other input of said amplifier being connected to a selected voltage whereby said amplifier output receives voltage pulses synchronized with the generated voltage pulses from said digital circuit to render said FET conductive and non-conductive in synchronism with the voltage pulses.

2. An interface according to claim 1, wherein said digital circuit comprises a computer.

3. An interface according to claim 1, wherein said digital circuit comprises a hand held terminal.

4. An interface according to claim 1, wherein said current loop has a first line for connecting positive terminals of the transmitter and power supply and a second line for connecting negative terminals of the transmitter and power supply, said diode being connected in said negative line.

5. An interface according to claim 1, including a voltage divider connected between said selected voltage and said other input of said amplifier for applying a small positive potential to said one input of said amplifier.

6. As interface according to claim 5, wherein said digital circuit comprises a communicating device which generates positive voltage pulses when it is active.

* * * * *